(12) United States Patent
Jones et al.

(10) Patent No.: US 7,841,637 B1
(45) Date of Patent: Nov. 30, 2010

(54) TRUCK RACK MOUNTING KIT

(75) Inventors: Gary L. Jones, Mt. Aukum, CA (US);
William De Masters, Shingle Springs, CA (US)

(73) Assignee: Truck Racks By Rack-It, Inc, Shingle Springs, CA (US)

( * ) Notice: Subject to any disclaimer, the term of this patent is extended or adjusted under 35 U.S.C. 154(b) by 0 days.

(21) Appl. No.: 12/072,979

(22) Filed: Mar. 1, 2008

(51) Int. Cl.
*B60P 3/00* (2006.01)
(52) U.S. Cl. ............................................. 296/3; 296/36
(58) Field of Classification Search .................. 296/36, 296/183.1, 181.3, 3; 224/405
See application file for complete search history.

(56) References Cited

U.S. PATENT DOCUMENTS

| | | | | |
|---|---|---|---|---|
| 5,836,490 A | * | 11/1998 | Price | 224/403 |
| 7,434,858 B1 | * | 10/2008 | Lastinger et al. | 296/3 |
| 2008/0079277 A1 | * | 4/2008 | Wethington | 296/3 |

* cited by examiner

*Primary Examiner*—Glenn Dayoan
*Assistant Examiner*—Pinel E Romain
(74) *Attorney, Agent, or Firm*—Mark C. Jacobs

(57) ABSTRACT

A mounting kit for a truck rack for a 2005 and later Toyota Tacoma® and other trucks having composite truck beds, which mounting kit has a pair of mirror image front brackets attachable to the truck frame, a pair of mirror image rear brackets attachable to a rear vertical beam of the truck, and two side rails of a truck rack having mirror image attachment points for connection the each of the four in toto front and rear brackets.

5 Claims, 5 Drawing Sheets

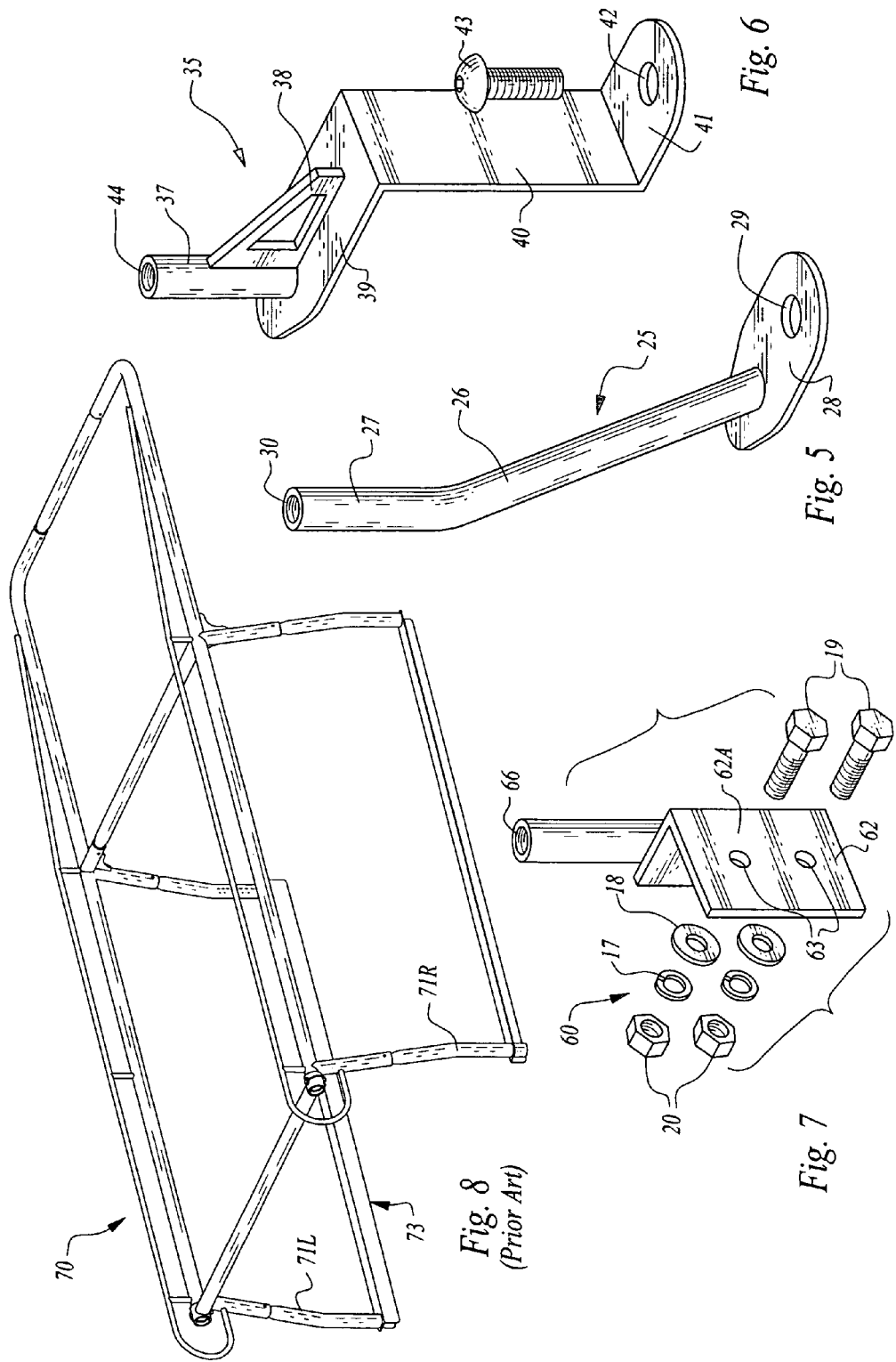

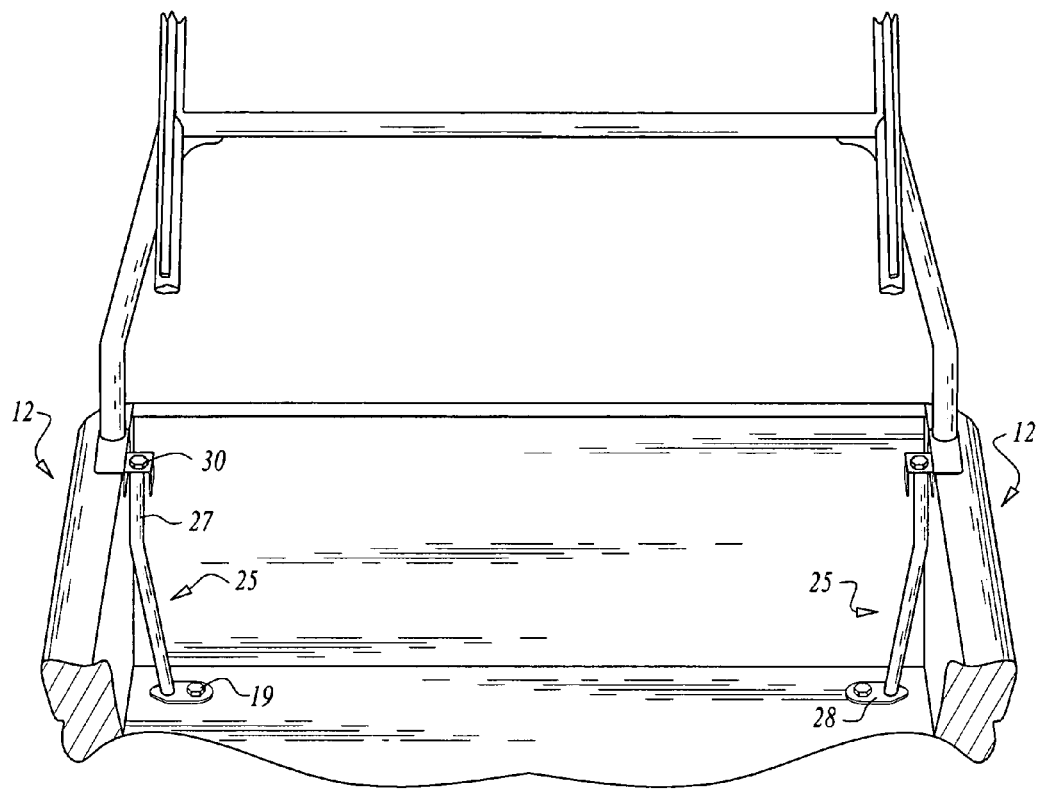
Fig. 9
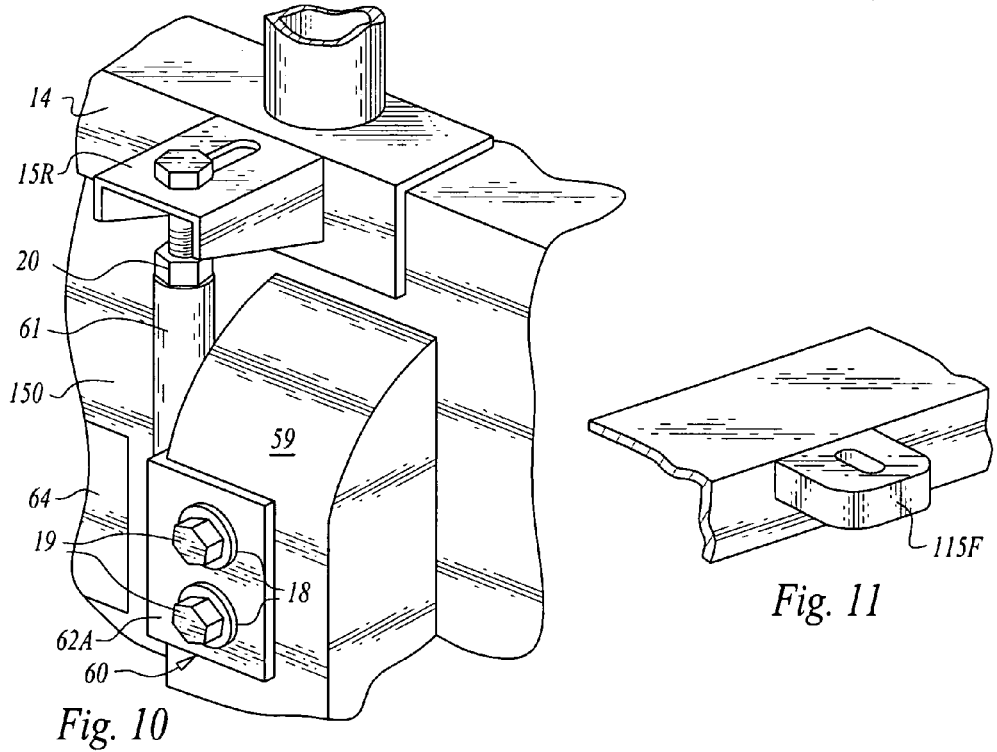
Fig. 10
Fig. 11

TRUCK RACK MOUNTING KIT

FIELD OF INVENTION

This invention pertains to an adapter built to permit the mounting of Rack-it® brand truck racks onto a 2005 and later Toyota Tacoma® pickup truck.

BACKGROUND OF THE INVENTION

Truck racks by Rack-it® has been a successful manufacturer of truck racks for many types of trucks including pickup trucks. The company has produced a modular truck rack for mounting onto various models of a multiplicity of manufacturers of trucks, including pickup trucks.

Up to 2005, the Tacoma® pickup truck, a mid-size pickup truck, was made in the conventional manner, using materials such as sheet steel or sheet aluminum alloy. But in 2005, in the desire to reduce overall truck weight in order to improve gas mileage and thus, sell more trucks, Toyota introduced a plastic truck bed. This plastic truck bed will not support the attachment of a truck rack. Therefore it became necessary to find an alternative means of attaching the truck to the truck. This invention achieves the desired result.

It is, therefore, one object of this invention to permit the mounting of at least Rack-it® brand truck racks onto the plastic beds of 2005 and later Toyota Tacoma® truck beds, which beds are known in the trade as composite beds.

It is another object to provide a mounting kit suitable for all four configurations of this truck.

It is a third object to provide a truck rack mounting kit for Tacoma® trucks that the "average joe" can utilize for mounting his Rack-it® truck rack onto a Toyota Tacoma® without a lot of effort or training.

It is a fourth object to provide a low cost truck rack mounting kit for the Toyota Tacoma® plastic (composite) truck bed.

Other objects of the invention will in part be obvious and will in part appear hereinafter.

The invention accordingly comprises the product possessing the features, properties, and the relation of components which are exemplified in the following detailed disclosure and the scope of the application, about which will be indicated in the appended claims.

For a fuller understanding of the nature and objects of the invention, reference should be made to the detailed description taken in conjunction with the accompanying drawings.

BRIEF DESCRIPTION OF THE FIGURES

FIG. 5 is a perspective view of the front bracket used in 3 of the 4 models of the Tacoma® pickup shown in FIG. 1.

FIG. 6 is a front perspective view of the front bracket of the mounting kit for this invention for the 4th Tacoma® pickup model as seen in FIG. 1.

FIG. 7 is a prior art perspective view of a prior art patented truck rack of the assignee of this invention.

FIG. 8 is a perspective view of a prior art typical truck rack made by applicant's assignee that cannot be mounted on a Toyota Tacoma® truck. Note the solid bar side rail designated 73.

FIG. 9 is a perspective view illustrating the mounting of the modified truck rack onto the front brackets of this invention for a long bed Toyota Tacoma® truck.

FIG. 10 is a perspective view showing the mounting of the modified truck rack onto the right rear beam of the truck bed area.

FIG. 11 is a graphical perspective view depicting a variant of one element of this invention.

SUMMARY OF THE INVENTION

This invention is an adapter kit to permit the mounting of at least modified Rack-it® truck racks onto year 2005 and later Toyota Tacoma® truck beds. The kit includes two different front brackets, one of which is suitable for each of the four different Tacoma® configurations of the 2007 product line, and a rear bracket suitable for use with all four Tacoma® truck configurations.

DESCRIPTION OF THE PREFERRED EMBODIMENT

In FIG. 1, the four configurations of the Toyota Tacoma® truck line for the 2007 model year are seen. The trucks per se form no part of this invention. The trucks designated 100A, 100B, 100C, and 100D, are as follows: model 100A features the standard size cab for the Tacoma® line, with a single row of seating be it a bench seat or two individual seats.

Model 100B has the same standard bed, with two rows of seating, and only two doors such that the rear jump seats are accessed by moving the front seat to get tot the back area.

Model 100C has a double-cab with four doors and two full rows of seating instead of jump rear seats. But the bed length is shortened such that the overall length of model 100C is the same as the overall length of model 100B, which is 208.1 inches, compared to the overall length off 190.4 inches for model 100A.

Model 100D is the longest truck in the line at 221.3 inches. It features the dual full cab with two rows of seats coupled to the standard bed of models 100A and 100B. All of these 2007 truck models are prior art.

Figure 1A:
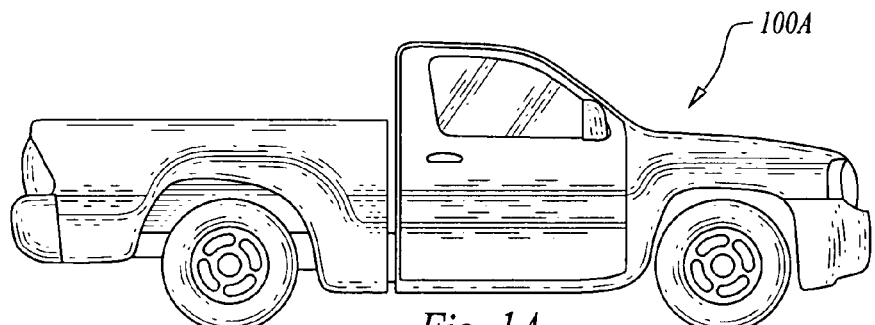
FIG. 1 (prior art) is a group side elevational view of the various models currently in the 2007 Toyota Tacoma® product line.
Figure 1B:
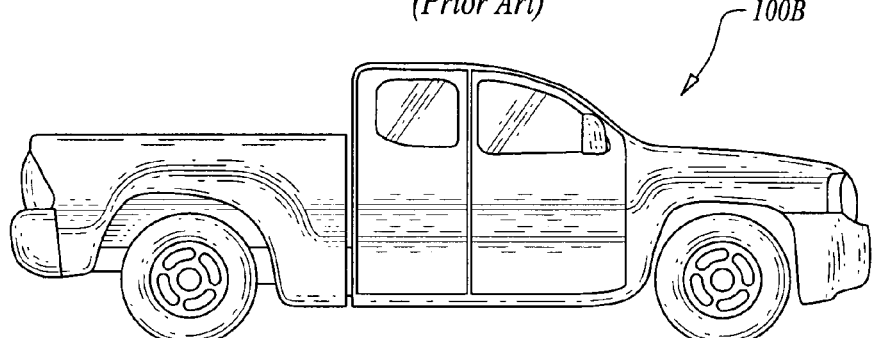
Figure 1C:
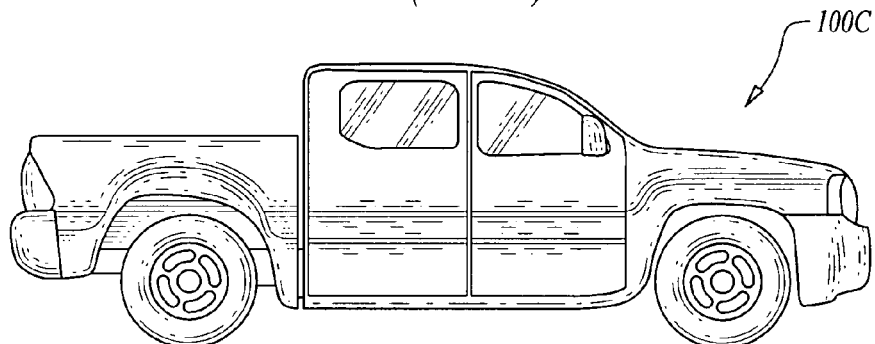
Figure 1D:
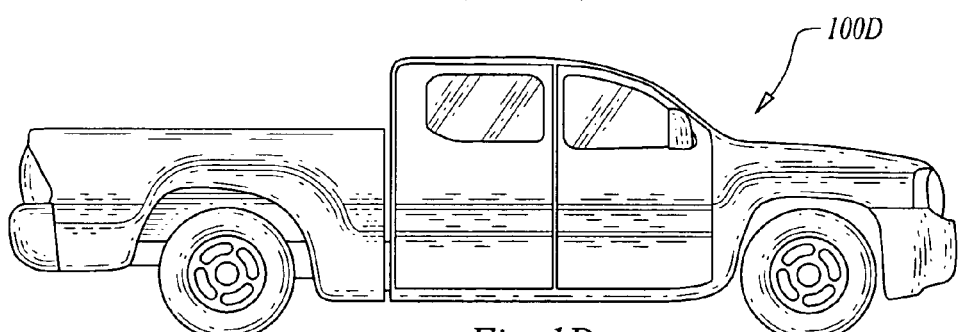
Figure 2:
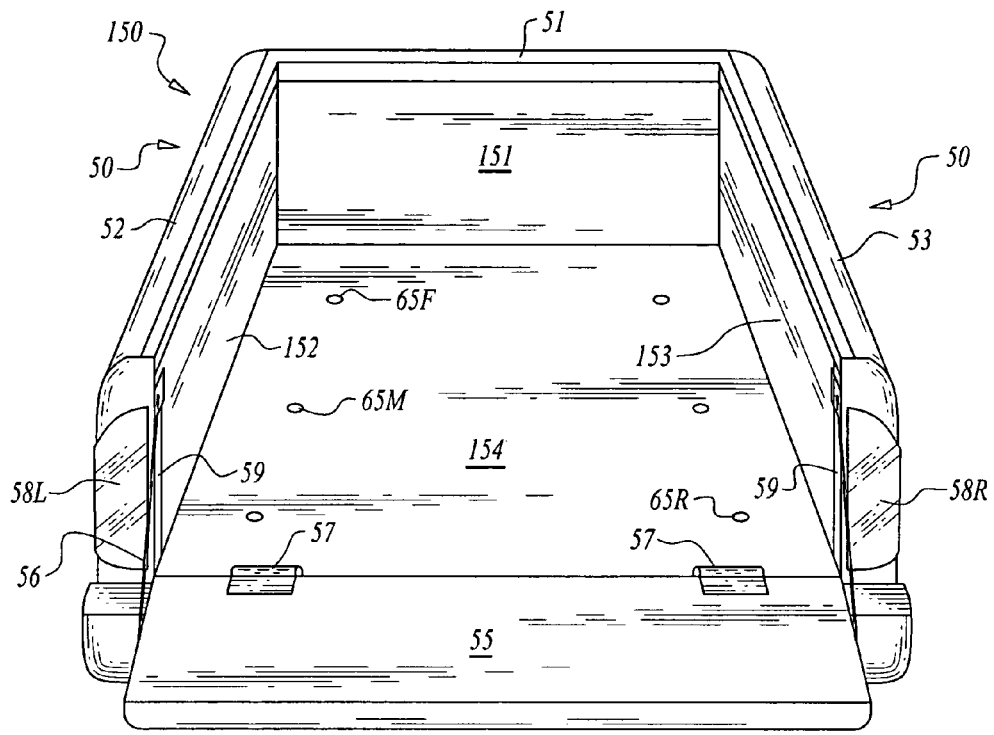
FIG. 2 is a perspective view of a truck bed of a pickup truck.

In FIG. 2, the unique truck bed construction of the Toyota Tacoma® is seen. The cab and wheels have been omitted for ease and convenience. In order to save weight and to thereby increase gasoline mileage, Toyota has done away with the conventional metal inside wall-outside wall hollow space in-between construction for the bed front and side walls.

Truck bed 150 comprises an outside metal bed shell, 50, comprised of a front metal bar, 51 that interconnects the two spaced and aligned mirror image single side walls, 52, 53. A composite one piece bed interior, 150, having an upstanding front wall, 151, side walls, 152 and 153, and a bottom wall, 154 all formed as an integral one-piece member is attached directly to the frame beneath, not seen, by a series of bolts, 19.

The tail gate is connected to each bed side wall, 52, 53, respectively, by a chain, 56 and a hinge(s), 57, in a conventional manner to permit raising and lowering of the tail gate, 55, a metal member.

This one piece composite plastic bed is substantially dent resistant, according to a Toyota salesman, who offered to pound the plastic unit with a ten pound hammer. While the destructibility may be as claimed, due to the relatively thin wall construction and the attachment of the bed, 150, only to the frame and to a cross member beam as in FIG. 4, there is no place to mount a truck rack in a normal fashion. Designator 59 is a short vertical beam adjacent each tail light the use of which is discussed infra.

While tail light assemblies 58L and 58R are shown here, as will be explained infra., they will have to be removed temporarily to attach elements of the device of this invention.

Figure 4:
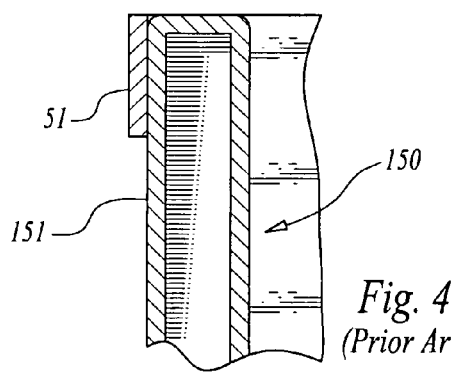
FIG. 4 is a side perspective graphical view of the front cross beam disposed in front of the composite material bed.

FIG. 4 is a side elevational cutaway view showing the one piece bed, 150, with its integrated front wall, 151, attached to front cross member, 51.

Figure 3:
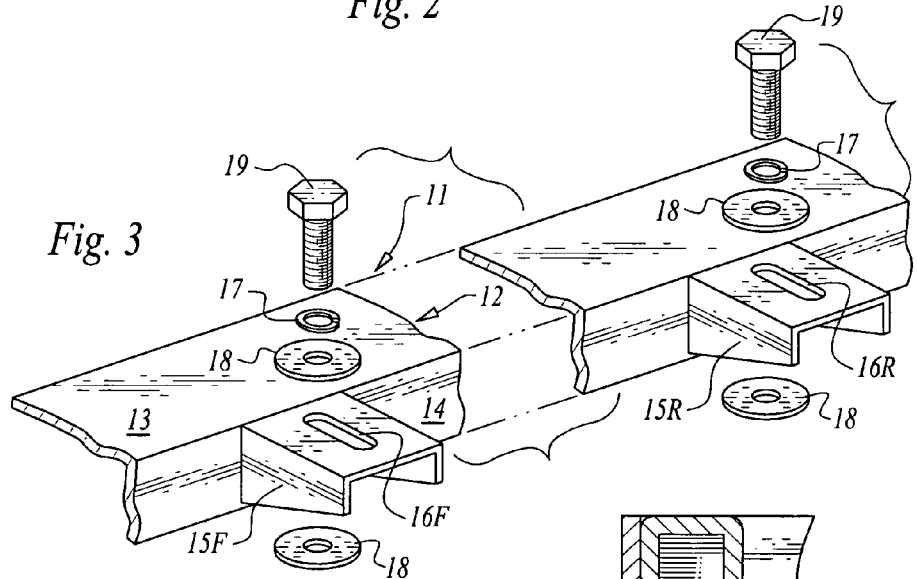
FIG. 3 is a graphical illustration of the bottom right side rail of a typical rack made by applicant's assignee, modified for use with this invention.

The discussion now turns to FIG. 3, which is a graphical illustration of a modified right side bottom rail to render a rack mountable on a Toyota Tacoma® truck side rail, 12.

Side rail 12, seen here as an L-shaped beam having a horizontal component 13, and a vertical component, 14. Contrast side rail, 12, with the solid bar side rail, 73, shown in FIG. 8 for the typical truck rack.

Rail 12 has a pair of spaced inverted U-shaped attachment points which are spaced apart at opposite ends of the side rail, 12. These attachment points or attachment members are designated 15F and 15R for front and rear locations. Each has a slot therein 16F and 16R, respectively, for the receipt of a bolt, 19, a lock washer 17, and a ring washer, 18, the latter being disposed both above and below the slot. The attachment points may be welded or otherwise attached to the vertical component, 14 of the side rail, 12.

FIGS. 5 and 6 relate to the front brackets 25 and 35 used for the four different styles of Toyota Tacoma® truck seen in FIG. 1. As can be seen, models designated 100A, 100B, and 100D, all have "long" truck beds, and they utilize the front bracket 25, seen in FIG. 5. The "short" truck bed model, 100C, utilizes the front bracket, 35, as seen in FIG. 6, for the mounting of a truck rack.

The long bed front bracket, 25, of FIG. 5, has a two part shaft, 26-27, the short section, 27, being disposed generally vertically and integrally connected to an angularly disposed longer section, 26. The second end of section 26 is attached to a base plate, 28, which may have an oval configuration. Base plate 28, has a bore, 29, for the receipt of the bed bolt, 43, shown in FIG. 6. The distal end of shaft section, 27, is tapped for receipt of a bolt, 19, not seen here.

The front bracket for the short bed is configured differently. It has a base plate, 41, with a center bore, 42. Plate, 41, is welded or otherwise attached to an upstanding vertical plate, 40 which may be disposed at a slight angle forwardly of about ten to fifteen degrees away from base plate 41. An upper horizontal plate, 39, is disposed in a direction away from the base, 41, to form a stylized Z-shaped member. At the forward end of said upper horizontal plate, 39, is an upstanding vertical tubular short shaft section, 37, having an internally threaded bore, 44, at the upper end thereof. A trapezoidal support flange, 38 is welded or otherwise attached to both the vertical shaft short section 37 and upper horizontal plate 39, serves to strengthen the mounting of the vertical shaft short section 37. The reason for the specific configuration employed for the short bed front bracket is the need to clear the front fender wells. Thus, horizontal plate 39 is seen to be overlaid yet spaced away from each fender. No such problem occurs with the front bracket 25 for the long bed trucks.

FIG. 7 relates to the rear bracket only the left one of which is shown in the FIGURE. This bracket, 60, has a lower L-shaped member, 62, with an internally threaded, 66, tubular section, 61, vertically attached to the exterior and is transversely disposed to the surface, 62B. The surface 62A has a pair of bores, 63, for the receipt of mounting bolts. See infra.

FIG. 8 is a prior art illustration of a typical truck rack made and sold by applicant's assignee. As shown, this prior art rack can NOT be used on the Toyota Tacoma®until it is modified, for reasons that will appear obvious from this discussion.

FIG. 9 is a perspective view that shows the two side rails, 12, attached to the left and right front brackets, seen alone, in FIG. 5.

Thus, attachment point, 15F is seen bolted to the front bracket 25's smaller tube portion 27 into threaded bore 30 using the bolt 19, seen in FIG. 3. Base 28 is seen bolted through the bed to the truck frame.

In FIG. 10, the right rear attachment point 15R is seen bolted to the rear bracket 60 seen in FIG. 7. The rear bracket 60, as seen in FIG. 7, is itself attached to the small rear vertical beam 59 of the truck bed. Designator 64 is a small storage box in the side wall of the composite bed 150.

A conventional bolt with washer is used for the connection of the attachment member 15 to tube portion 61 of rear bracket 60. Similarly, the bracket axial section, 62A is mounted with conventional bolts to the vertical beam 59.

Figure 12:
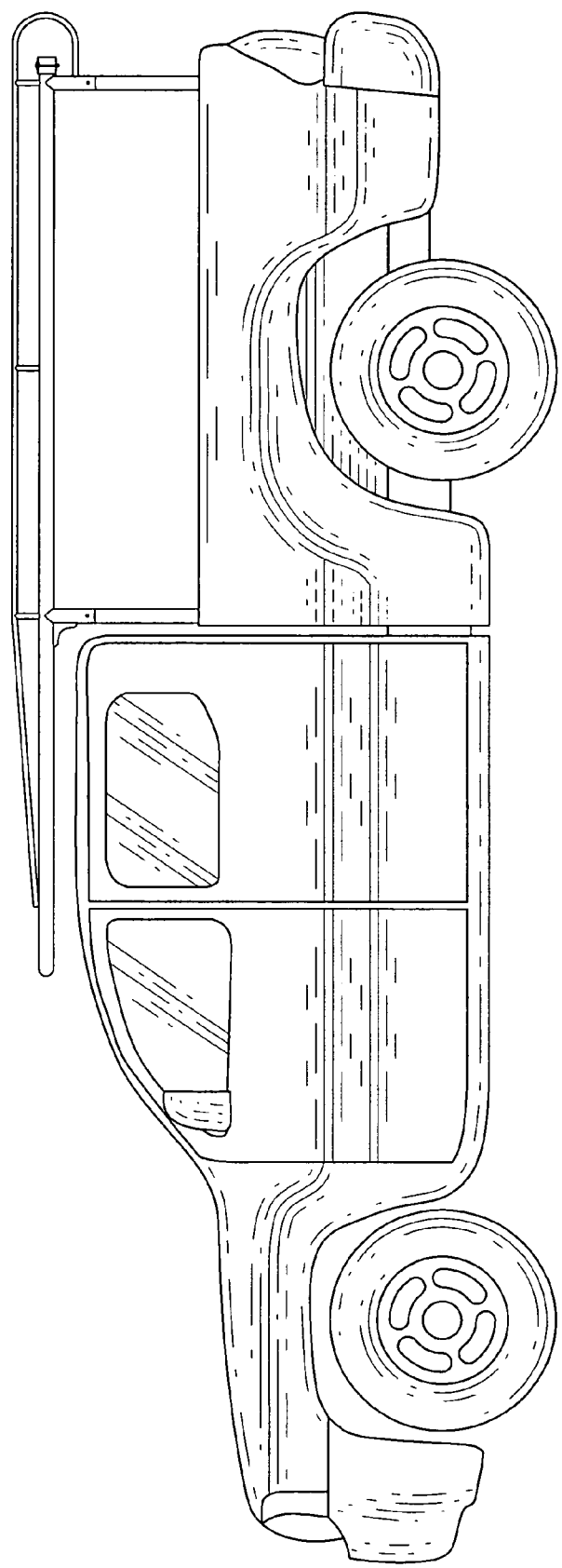
FIG. 12 is a perspective view of a recent Toyota Tacoma® truck showing a truck rack of Applicant's Assignee mounted on the bed thereof, using the invention of this application.

VOILA!! FIG. 12 shows the fully mounted modified truck rack disposed on a Toyota Tacoma® quad cab truck. How is this achieved?

Installation—

First one sets the rack on the truck bed, that is, the two side rails 12 are set down on the side walls of the truck bed, 52 and 53. The side rails merely rest there; they are not attached to the side walls, 52 and 53.

Next, remove the two front bed bolts, 65F, with 65M being the middle bolts, and 65R being the rear two bolts. Bolt the appropriate front brackets, 25 or 35, with the first bracket, 25 being for the long bed truck, and bracket 35 being for the short bed version, to the frame using the front bed bolts. See FIG. 9. Do not fully tighten to allow for some movement as may be needed to attach the rear attachment points of the modified side rail, 12.

Next, using a ½-13 bolt, with a lock washer, and two flat washers, bolt the two attachment points to the top of the two chosen front brackets. Again see FIG. 9.

Remove the two tail lights, 58L and 58R to provide adequate work space for the next step.

Using a ½-13 bolt, with a lock washer, 17, and two flat washers, 18, bolt the rear bracket to the rear attachment points on each of the two side rails, 12. Tighten these bolts securely.

Hold the rear bracket in position against the vertical beam 59, and drill two ⅝" holes into the beam, 59, on both the left and right sides of the truck bed. Install the two 3-8-16 bolts, 19 using a flat washer, 18, a lock washer, 17, and a nut, 20. Make sure all bolts are tight and then replace the tail lights this completes the attachment of the modified side rail truck rack to the Toyota Tacoma® truck bed.

Since certain changes may be made in the above detailed apparatus without departing from the scope of the invention herein involved, it is intended that all matter contained in the above description and shown in the accompanying drawings shall be interpreted as illustrative and not in a limiting sense.

While the attachment points on the side rails of the truck rack have been shown to be inverted U-shaped members, with a slot in the base of the U, any suitable shape, such as the slotted arcuate edged bar stock of attachment point, 115F, shown in FIG. 11, may be employed, by welding them into position at pre-determined locations.

It is within the skill of the art to determine where along the side rail the two attachment members should be located. The locations are determined by the location of the composite bed front mounting bolts and the rear vertical beam.

It is to be noted that both the front brackets and rear brackets are used in mirror image pairs, even though only one member of the pair has been discussed. See FIG. 9

It is seen that this is the first installation of a truck rack on a 2005 or later Toyota Tacoma® truck. The ability to have a truck rack on this very popular series of trucks adds to the business uses and enjoyment of the Tacoma® trucks.

We claim:

1. A mounting kit to attach a truck rack to a 2005 and later composite material truck bed, which kit comprises:
   A. A pair of mirror image front brackets, which brackets are attachable through the truck bed to the frame, and
   B. A pair of mirror image rear bracket attachable to a rear vertical beam of a truck bed, both of said front and both of said rear brackets also being attachable to a side rail of a truck rack, and
   C. A truck rack side rail being front and rear attachment points for connection to said front and rear brackets wherein front and rear attachment points present on said truck rack side rail are inverted U-shaped members with a slot in the base of the U.

2. A mounting kit to attach a truck rack to a 2005 and later long bed truck's composite material truck bed, which kit comprises:
   A. A pair of mirror image front brackets, which brackets are attachable through the truck bed to the frame, and
   B. A pair of mirror image rear bracket attachable to a rear vertical beam of a truck bed, both of said front and both of said rear brackets also being attachable to a side rail of a truck rack, and
   C. A truck rack side rail being front and rear attachment points for connection to said front and rear brackets 1 wherein the front brackets each comprise:
   a base plate having a bore therein with an inclined longer tubular portion connected to a small vertical tubular section having internal threads, said front brackets being employed for mounting a truck rack on the said long bed truck bed.

3. A mounting kit to attach a truck rack to a 2005 and later short bed truck's composite material truck bed, which kit comprises:
   A. A pair of mirror image front brackets, which brackets are attachable through the truck bed to the frame, and
   B. A pair of mirror image rear bracket attachable to a rear vertical beam of a truck bed, both of said front and both of said rear brackets also being attachable to a side rail of a truck rack, and
   C. A truck rack side rail being front and rear attachment points for connection to said front and rear brackets wherein the front brackets are intended for mounting to the short bed truck bed model, which front brackets comprise a stylized Z-shape member to which a vertical tubular short section having an internally threaded upper end is attached.

4. The mounting kit of claim 3 wherein the vertical tubular short section has a flange attached to it and attached to the stylized Z-shaped member.

5. A mounting kit to attach a truck rack to a 2005 and later composite material truck bed, which kit comprises:
   A. A pair of mirror image front brackets, which brackets are attachable through the truck bed to the frame, and
   B. A pair of mirror image rear bracket attachable to a rear vertical beam of a truck bed, both of said front and both of said rear brackets also being attachable to a side rail of a truck rack, and
   C. A truck rack side rail being front and rear attachment points for connection to said front and rear brackets wherein the rear brackets each comprise an L-plate to which is attached a vertical tubular portion, which is internally threaded at the top, attached thereto.

* * * * *